United States Patent [19]
Schaefer

[11] Patent Number: 5,826,462
[45] Date of Patent: Oct. 27, 1998

[54] PLASTIC SLIDER PAD FOR GEARBOX SHIFT FORK

[75] Inventor: Helmut Schaefer, Ketsch, Germany

[73] Assignee: Deere & Company, Moline, Ill.

[21] Appl. No.: 727,815

[22] Filed: Oct. 8, 1996

[30] Foreign Application Priority Data

Oct. 27, 1995 [DE] Germany ......................... 195 39 967.6

[51] Int. Cl.⁶ .............................. F16H 63/32; G05G 3/00
[52] U.S. Cl. ....................................... 74/473.37; 192/82 R
[58] Field of Search ............................ 74/473 R, 473.36, 74/473.37; 192/82 R

[56] References Cited

U.S. PATENT DOCUMENTS

| | | | |
|---|---|---|---|
| 3,257,861 | 6/1966 | Siefferman | 74/473 R |
| 4,353,449 | 10/1982 | Lamy et al. | 74/473 R X |
| 4,529,080 | 7/1985 | Dolan | 74/473 R X |
| 4,531,623 | 7/1985 | Arai et al. | 192/82 R |
| 5,027,672 | 7/1991 | Salvatori et al. | 74/473 R |
| 5,201,237 | 4/1993 | Berndtson | 74/473 R |

FOREIGN PATENT DOCUMENTS

| | | | |
|---|---|---|---|
| 2668236 | 4/1992 | France | 192/82 R |
| 55-2815 | 1/1980 | Japan | 192/82 R |

OTHER PUBLICATIONS

German search report dated Jun. 12, 1996.

*Primary Examiner*—Charles A. Marmor
*Assistant Examiner*—Troy Grabow

[57] ABSTRACT

A replaceable shift pad which can be mounted on the end of a shift fork comprises two plate-like side legs which are interconnected and parallel to each other. The inner sides of the side legs contact appropriate side surfaces of the shift fork. The outer sides of the side legs comprise sliding planes for sliding force transmission between the shift fork and a rotating shift sleeve. To provide a large supported area between the shift fork and the shift sleeve and to provide a shift pad which is resistant against vibratory stress it is suggested to connect the two side legs to each other by connecting means which are in line with the side legs, and which are tangentially orientated with regard to the shift sleeve rotation direction and extend beyond the end of the shift fork.

15 Claims, 3 Drawing Sheets

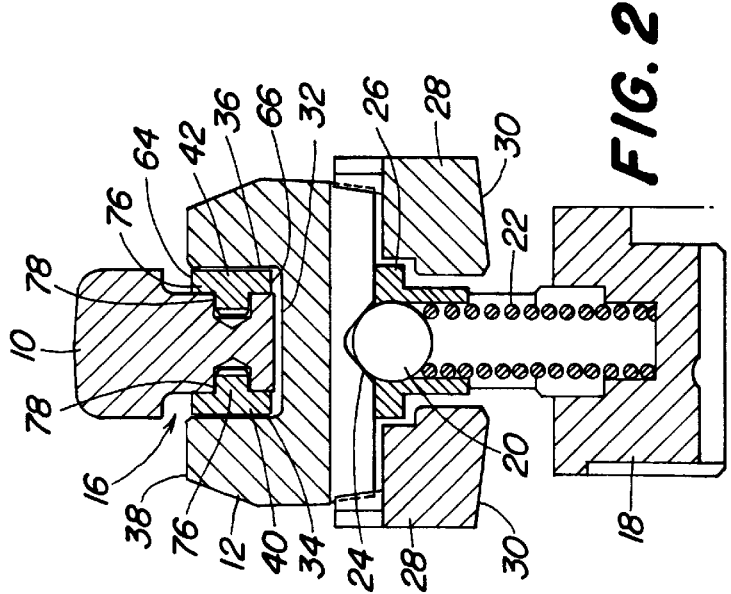
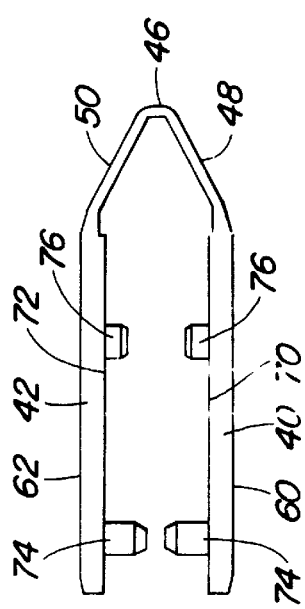
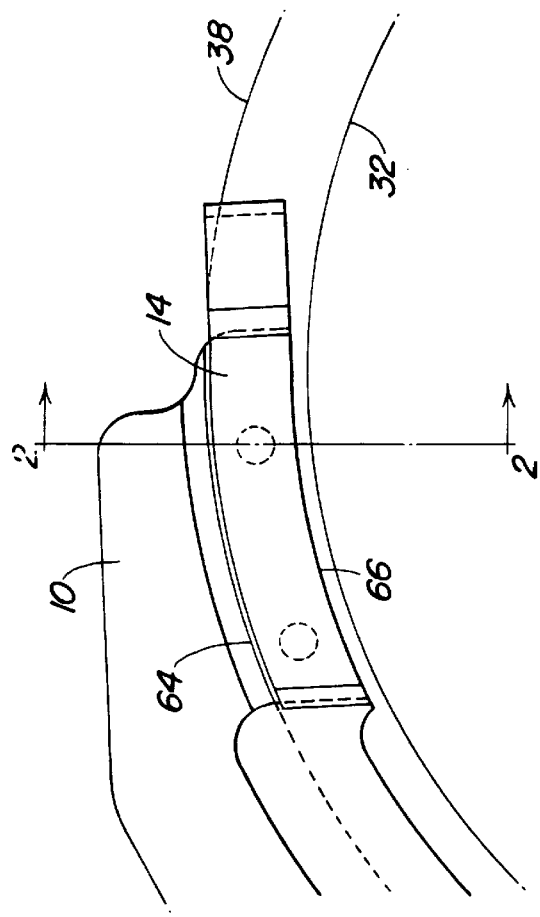

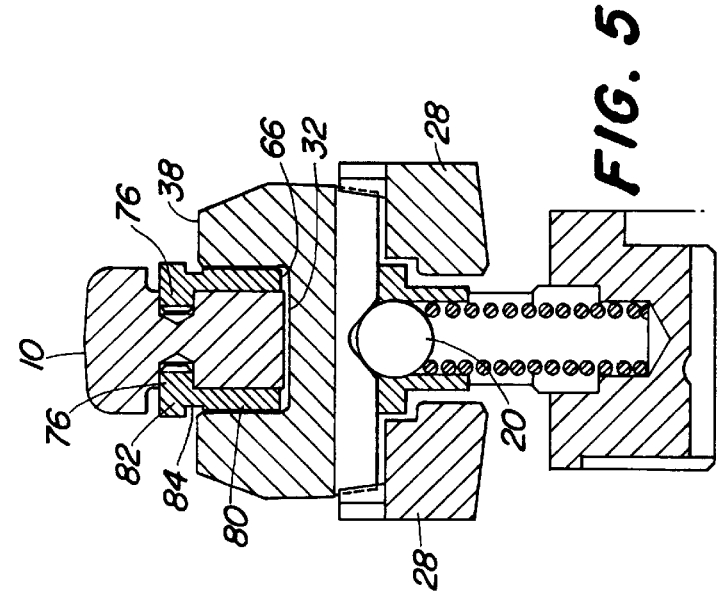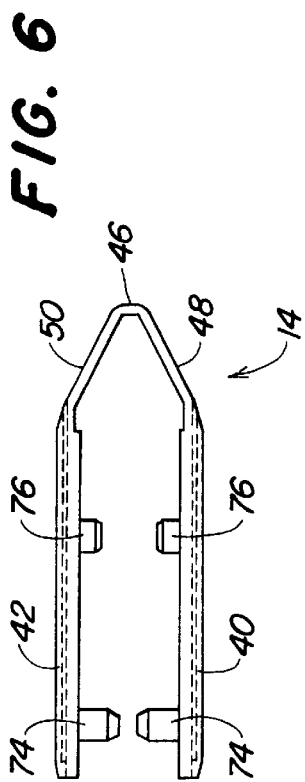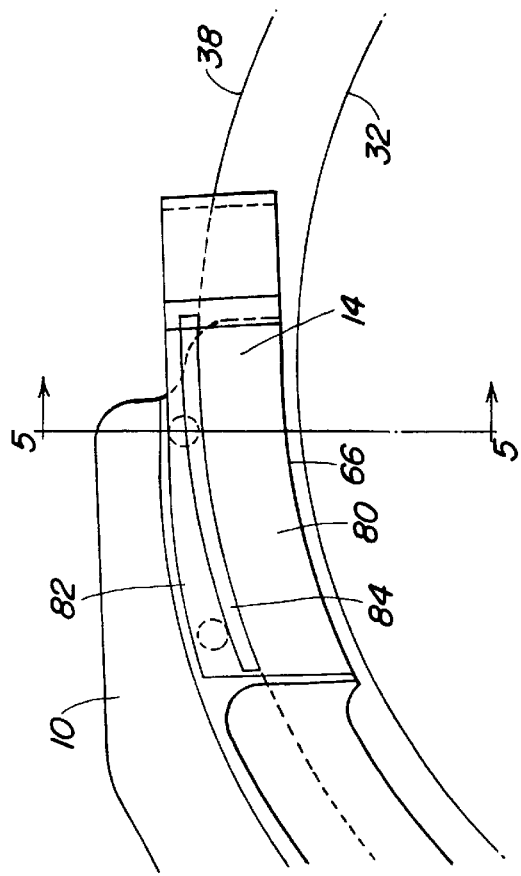

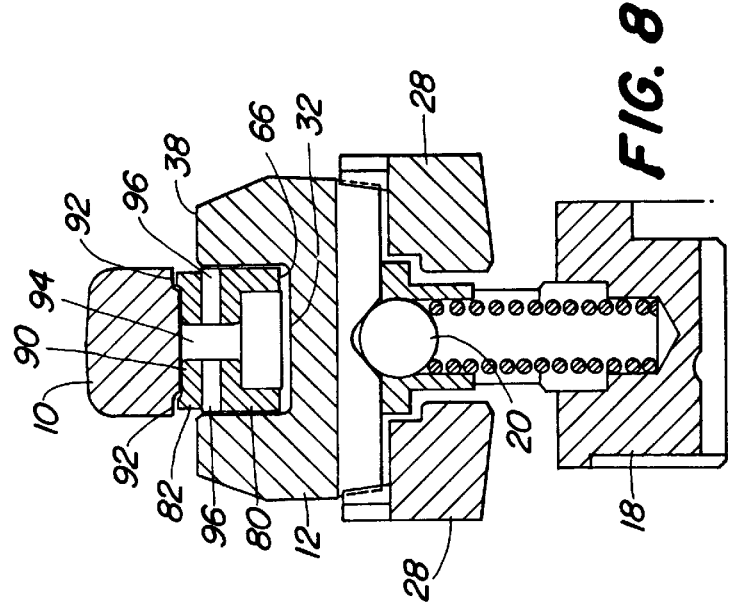
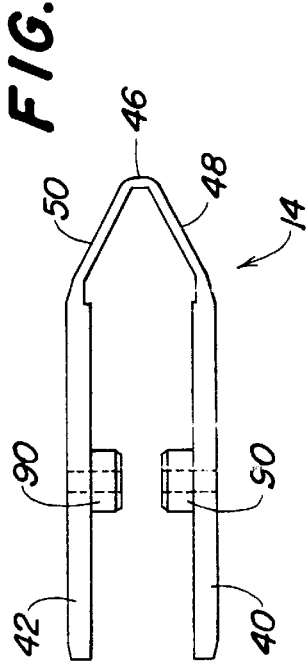
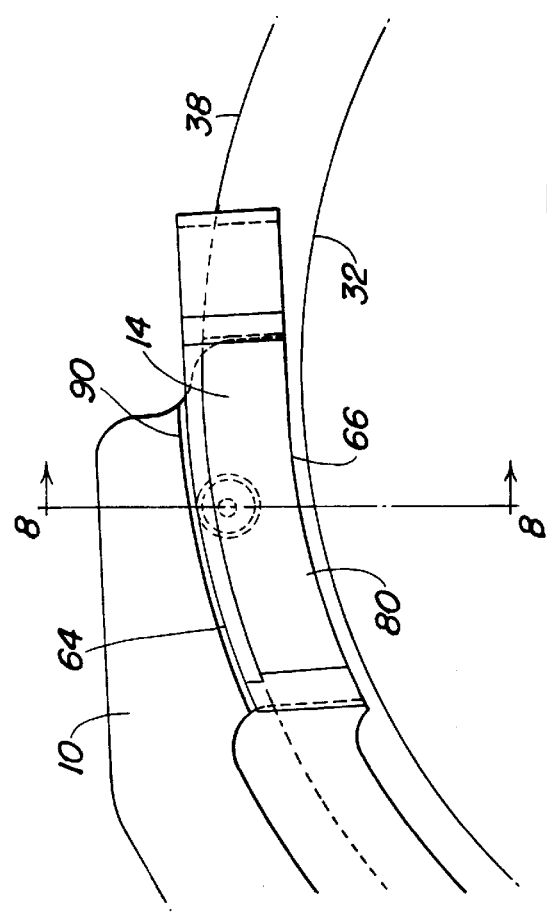

PLASTIC SLIDER PAD FOR GEARBOX SHIFT FORK

FIELD OF THE INVENTION

The present invention relates generally to gearbox shift forks and, more specifically, to an improved replaceable plastic slider pad to be slid onto an end of a gearbox shift fork.

BACKGROUND OF THE INVENTION

Plastic coatings are frequently used as paired materials in sliding between stationary gearbox shift forks and rotating shift sleeves in synchronized gearboxes. These coatings can be sprayed onto the shift fork or can be applied in a vortex sintering process. Plastic linings and plastic coatings have a lower coefficient of friction and can generally be manufactured at lower cost than conventional designs with molybdenum coatings, surface hardening or nonferrous heavy metallic slider pads (U.S. Pat. No. 3,257,861). In the case of repair work, however, a plastic-coated gearbox shift fork must be replaced as a complete unit. Furthermore in smaller quantities the manufacturing costs are relatively high and facilities for the fully automatic application of the slider coating cannot be justified.

DE-GM-71 05 111 discloses a shift fork whose steel body is provided with a plastic lining that can be slid into place, whose cross section is U-shaped and which is supposed to be secured against sliding on the body by means of crimped sections. Furthermore, replaceable plastic slider shoes (so-called "shift pads") that can be slid individually onto each of the two ends of a gearbox shift fork are on the market. In the case of repair work the damaged plastic slider shoes can be replaced with new ones without the necessity of replacing the entire gearbox shift fork. The plastic slider shoes can be manufactured at low cost.

Similar to the plastic linings described in DE-GM-71 05 111, the cross section of conventional plastic slider shoes is U-shaped in such a way that the two side legs of the U form side walls at each side, which are in sliding contact with the shift sleeve. Such a plastic slider shoe is described in Patent Abstracts of Japan CD-ROM JP 07133865 A. The connecting leg of the U, which connects the side legs, is located radially inward with respect to the shift sleeve and covers the radially inner side of the end of the gearbox shift fork. The region in which force is transmitted is supported by the shift sleeve and the shift fork and is limited by the connecting leg. Furthermore there is the danger that under shock loads the side walls of the known U-shaped plastic slider shoes will fail in shear.

U.S. Pat. No. 5,201,237 reveals a shift fork for a vehicular transmission which utilizes contact pads which are separate, unconnected pieces and must be installed individually. Use of separate contact pads reduces the risk of failure due to axial shock loading, but installation and replacement are more cumbersome than one-piece pads, as the pads must be mounted separately and may not be interchangeable.

U.S. Pat. No. 5,027,672 teaches a shift fork insert which includes an intermediate spacer block which connects side walls of the insert. The spacer block is disposed on the radially inner side of the insert corresponding to a notch formed in the shift fork. The spacer block extends the entire width of the shift fork and its depth exceeds the depth of the shift fork notch. Therefore a substantial portion of the contact area is unsupported by the shift fork while under axial load and there remains a considerable risk of failure due to axial shock loading.

In a typical case shock loads occur when synchronizer rings in a synchronized gearbox are worn, if the clutch is not fully disengaged during a gear shift and, in the case of non-synchronized gearboxes, shifting is performed when not completely stopped. Under these conditions the gears clash and the engaging teeth of the gears and the shift sleeve climb over one another during relative rotation, which results in a high frequency axial movement of the shift sleeve against the shift fork. The consequent very strong shock impulses can lead to breakage of the plastic slider shoes. It has been established that a typical break travels along the inner contour of the shift fork, at the transition between side wall and connecting leg of the plastic slider shoe. A further break can develop in the region of the side wall of the plastic slider shoe which is in contact with the outer circumference of the shift sleeve, that is, at the point at which the plastic slider shoe emerges from the surrounding groove of the shift sleeve. In designs in which the area of engagement between the shift sleeve and the shift fork is relatively small for reasons of space, the known plastic slider shoes cannot be used by reason of the type of damage described.

The problem underlying the invention is seen as that of defining a plastic slider pad of the aforementioned class that can be slid in place, that maintains the advantages noted for plastic slider shoes, does not limit the region supported by the shift sleeve and the shift fork and will not be damaged by shock loading.

BRIEF SUMMARY OF THE INVENTION

It is an object of the present invention to provide an improved plastic slider pad that can be slid in place, that maintains the advantages noted for plastic slider shoes and does not limit the region supported by the shift sleeve and the shift fork.

It is a further object of the present invention to provide an improved plastic slider pad that will not be damaged by shock loading.

According to the present invention there is an improved slider pad for a gearbox shift fork wherein the plastic slider pad contains two plate-shaped side legs connected to each other, generally directed parallel to each other, that are in contact with the sides of the gearbox shift fork and cover at least partially both sides of the end of the gearbox shift fork. The outer surfaces of the side legs contain slider surfaces that are used to transmit force between the gearbox shift fork and a rotating shift sleeve that is to be shifted.

The plastic slider pad according to the invention contains two plate-shaped side legs that are generally parallel to each other. The two side legs are connected to each other by connecting means which is generally tangential with respect to the direction of rotation of the shift sleeve.

In the plastic slider pad according to the invention a connecting leg between the radially inward portion of the shift fork and the shift sleeve can be omitted. Thereby the radial space between the shift sleeve and the shift fork is not preempted by components of the plastic slider pad. The region supported by the shift sleeve and the shift fork is not reduced and can be completely utilized. Thereby the mass of the plastic slider pad that is present outside the contact region (that is, the region supported by the shift sleeve and shift fork) can be minimized.

Most appropriately the two legs are configured as elongated strips directed along the circumferential direction of the shift sleeve. At one end of each of the two strips connecting means are attached that connect the strips to each other.

The connecting means preferably contains at least one elastic, thin-walled connecting link that may be configured as a strip. As an approximation of its size the cross section of the connecting link may be half as large (for example, half as thick) as that of the side legs.

Preferably the plastic slider pad is configured generally U-shaped, where the side legs of the U-shape are in sliding contact with the shift sleeve. A base member of the U-shape is used as a connecting link for connecting the side walls. When the plastic slider pad is slid onto the end of the shift fork, the connecting link is oriented tangentially with respect to the shift sleeve and extends beyond the end of the shift fork.

According to an appropriate further development of the invention a V-shaped base member is used as connecting means, which consists of two legs that join at an acute angle, the free ends o f whose legs each blends into each of the side legs.

The side legs of the plastic slider pad are preferably configured as elongated strips whose radially inner and/or outer side edges, relative to the shift sleeve, are appropriately arc shaped to conform to the contour of the gearbox shift fork and/or the shift sleeve. This makes possible an optimum utilization of space. Furthermore the outer contour of a side leg can be in contact with a corresponding machined contour or recess of the gearbox shift fork for supporting twisting torques. The resulting large base of support makes it possible that only small loads must be absorbed by detent means used for the attachment of the plastic slider pad to the gearbox shift fork.

Furthermore a side leg configured as an elongated strip may be subdivided into a slider region and a carrier region. Both regions are parallel to each other and are oriented in the longitudinal direction. Preferably a longitudinal groove, open to the outside of the side leg, or a relief slot is provided between both regions. In addition or alternatively thereto the two regions may be provided with differing side leg thicknesses. Here the carrier region may be designed to be thicker or thinner than the slider region depending on the application.

To fasten and retain the plastic slider pads to the end of the gearbox shift fork, at least one detent means is preferably attached to at least one of the side legs for engaging a corresponding recess in the gearbox shift fork. By the use of such detent means the plastic slider pad can be fastened reliably without tools and additional devices. Furthermore the detent means make it possible to secure the plastic slider pad in a definite position. To install the plastic slider pad the two side legs may be widened or bent apart, deflecting the connecting leg, and then positioned over the end of the gearbox shift fork. After reaching the detent position the two side legs may be released so that they return elastically to their original shape and the detent means engage the corresponding recesses in the gearbox shift fork.

The detent means are most appropriately connecting pins or detent pins that are formed onto the side legs and project from the surfaces of the two side legs that face each other. The connecting pins are used to engage corresponding bores in the gearbox shift fork. Preferably at least some of the connecting pins are provided with axial bores that can prevent an oil cushion from building up due to axial vibrations in the bore of the gearbox shift fork that engages the connecting pin.

A reliable attachment of the plastic slider pad to the gearbox shift fork can also be attained by two connecting pins projecting inward from each of the two side legs. The pins on each side leg are spaced from one another and engage corresponding bores in the gearbox shift fork. Preferably, the connecting pins located closer to the connecting means are shorter than those located at a greater distance, since during the installing and bending apart of the plastic slider pads the connecting pins located nearby will not separate as far from one another as those located at a greater distance.

In order to create a supported contact surface as large as possible, the connecting or detent pins may be located, at least partially, in a carrier region outside the contact region of the side legs.

The drawing shows three embodiments of the invention on the basis of which the invention as well as further advantages and advantageous further developments and embodiments of the invention shall be explained and described in greater detail in the following.

BRIEF DESCRIPTION OF THE DRAWINGS

FIG. 1 shows a side view of an end region of a gearbox shift fork to which a first embodiment of a plastic slider pad according to the invention is applied.

FIG. 2 shows a partial section through a synchronizer arrangement along the line 2—2 indicated in FIG. 1.

FIG. 3 shows a front view of the plastic slider pad shown in FIGS. 1 and 2.

FIG. 4 shows a side view of the end region of a gearbox shift fork to which a second embodiment of a plastic slider pad according to the invention is applied.

FIG. 5 shows a partial section through a synchronizer arrangement along the line 5—5 indicated in FIG. 4.

FIG. 6 shows a front view of the plastic slider pad shown in FIGS. 4 and 5.

FIG. 7 shows the side view of an end region of a gearbox shift fork to which a third embodiment of a plastic slider pad according to the invention is applied.

FIG. 8 shows the partial section through a synchronizer arrangement along the line 8—8 indicated in FIG. 7.

FIG. 9 shows a front view of the plastic slider pad shown in FIGS. 7 and 8.

DETAILED DESCRIPTION OF PREFERRED EMBODIMENTS

FIG. 1 reveals an end region of a gearbox shift fork 10 which straddles a shift sleeve 12 of a conventional gearbox synchronizer arrangement and includes two end regions. A plastic slider pad 14 is slid onto the end of the gearbox shift fork 10, which is shown in side view in FIG. 1.

According to FIG. 2 the synchronizer arrangement contains a gearbox shift fork 10 that engages with its ends a surrounding groove 16 of a shift sleeve 12. The shift sleeve 12 can be moved axially, that is to the right and the left as seen in FIG. 2, by the gearbox shift fork 10. Furthermore the synchronizer arrangement contains a synchronizer body 18, balls 20, synchronizer springs 22, thrust pieces 26, and synchronizer rings 28. The synchronizer body 18 is non-rotatably supported on a shaft (not shown), and the balls 20 are arranged in the synchronizer body 18 and are forced by synchronizer springs 22 into a V-shaped recess 24 in the shift sleeve 12. The synchronizer rings 28 are provided with conical surfaces 30 which, upon axial movement of a ring, are forced against corresponding conical surfaces of adjacent gears (not shown) in order to bring about synchronized rotation. The method of operation of synchronizer arrangements is known and is not explained any further here.

The surrounding groove 16 of the shift sleeve 12 contains a cylindrical bottom surface 32 and two radial ring surfaces 34, 36 that extend generally between the bottom surface 32 and a cylindrical circumferential surface 38 of the shift sleeve 12.

As shown in FIG. 2 each of the side surfaces of the gearbox shift fork 10 is in contact with a side leg 40, 42 of the plastic slider pad 14 which generally fill the spaces on either side between the side surfaces of the gearbox shift fork 10 and the ring surfaces 34, 36 of the shift sleeve groove 16.

The plastic slider pad 14 consists generally of two generally parallel side legs 40, 42, which are connected to each other by a strip-shaped connecting link or element 46. Each of the narrow end faces of the elongated side legs 40, 42 are connected to each other by the connecting element 46, so that the side legs 40, 42 are generally aligned with the connecting element 46. Starting from the side legs 40, 42 the connecting element 46 extends generally tangentially with respect to the surrounding bottom surface 32 of the shift sleeve 12.

As shown in FIG. 3, the connecting element 46 consists of two connecting legs 48, 50 that are connected to each other at a peak in a V-shaped configuration. The other ends of the connecting legs 48, 50 are each connected to an end of one of the side legs 40, 42. The side legs 40, 42 and the connecting element 46 form a generally U-shaped component whose base member is formed by the connecting legs 48, 50 in their V-shaped connection.

The connecting legs 48, 50 of the connecting element 46 are approximately the same width (FIG. 1), but only approximately half as thick (FIG. 3) as the side legs 40, 42. Thereby the connecting element 46 is relatively thin-walled and elastic and makes it possible for the free ends of the side legs 40, 42 to be bent apart elastically or moved away from one another.

As can be seen in FIG. 1, radial side edges 64, 66 of the side legs 40, 42 are arc-shaped and conform to the cylindrical bottom surface 32 of the shift sleeve groove 16 and the circumferential surface 38 of the shift sleeve 12. The region of the gearbox shift fork 10 that is intended to engage the side legs 40, 42 of the plastic slider pad 14 is configured correspondingly.

The surfaces of the side legs 40, 42 that are directed axially outward are configured as slider surfaces 60, 62 (slider regions), which slide on the ring surfaces 34, 36 of the shift sleeve groove 16 during the shifting process and serve to transmit shifting pressure to the shift sleeve 12 and the synchronizer rings 28. Two connecting pins 74, 76 project from each of two surfaces 70, 72 of the side legs 40, 42 facing each other, are arranged one behind the other in tangential direction (FIG. 3), and engage corresponding bores 78 in the gearbox shift fork 10 (FIG. 2). The two connecting pins 76 located nearer to the connecting element 46 are shorter than the connecting pins 74 located in the region of the free ends of the side legs 40, 42. This makes the assembly easier and assures a reliable attachment to the gearbox shift fork 10.

The embodiment described on the basis of FIGS. 1 through 3 represents a very simple embodiment. Here the side legs 40, 42 are so configured that their outer surfaces are completely used as slider surfaces 60, 62 so that, aside from the connecting element 46, there are no masses located outside the contact region to both sides (that is, areas supported by the gearbox shift fork as well as the shift sleeve). The connecting pins 74, 76 are located in the contact region between the gearbox shift fork 10 and the shift sleeve 12.

A second embodiment for a plastic slider pad is shown in FIGS. 4 through 6. Here the corresponding item are given the same number call-outs as in FIGS. 1 through 3.

The principal difference between the first and the second embodiment lies in the fact that in the second embodiment each of the side legs 40, 42 is subdivided into a slider region 80 and a carrier region 82. Both regions 80, 82 are parallel to each other and alongside one another in radial direction. The slider region 80 and the carrier region 82 are separated from each other by a groove 84 opening outward and whose radially inner edge corresponds approximately with the circumferential surface 38 of the shift sleeve 12. As shown in FIG. 5 the side legs 40, 42 are thicker in their carrier region 82 than in their slider region 80. The connecting pins 74, 76 are located entirely in the carrier region 82 and outside the slider region 80.

Above all, the second embodiment has the advantage that a maximum supported surface results since the connecting pins 74, 76 also are located outside the slider region 80.

A third embodiment of a plastic slider pad is shown in FIGS. 7 through 9. Here too the corresponding components are identified with the same part number call-outs as in FIGS. 1 through 3.

In contrast to the first embodiment, each of the side legs 40, 42 of the plastic slider pad 14 contain only one connecting pin 90 with larger dimensions. The contact of the arc-shaped side edge 64 of the plastic slider pad 14 to the corresponding circular machined contour 92 of the gearbox shift fork 10 insures against twisting. At its outside the carrier region 82 is somewhat retracted compared to the slider region 80, that is, it is designed somewhat thinner.

The third embodiment results in a large supported area, since the connecting pins 90 lie only in part in the slider region 80. The retraction between the slider region 80 and the carrier region 82 prevents shear loads from going through the edge of the circumferential surface 38 of the shift sleeve 12. The radial support of the side edge 64 on the contour 92 of the gearbox shift fork 10 permits a large base of support and keeps the forces transmitted by the connecting pins 90 small.

The connecting pins 90, are provided with coaxial through bores 96 and engage a common through bore 94 in the gearbox shift fork 10. This prevents the build-up of an oil cushion in the through bore 94 of the gearbox shift fork 10 due to axial vibrations.

Although the invention has been described in terms of a few embodiment examples, anyone skilled in the art will see many varied alternatives, modifications and variations in the light of the above description as well as the drawing, all of which fall under the present invention. In particular, the field of application of the plastic slider pad according to the invention is not limited to synchronizer arrangements, but encompasses, for example, simple shift sleeve gearboxes.

What is claimed is:

1. A removable plastic slider pad to be slid onto a gearbox shift fork for shifting a rotating shift sleeve, said plastic slider pad comprising:
   a. two side legs generally oriented parallel to each other and adapted for being slid onto side surfaces of the gearbox shift fork;
   b. connecting means for connecting the side legs to each other, said connecting means extending beyond a distal end of the shift fork generally tangentially with respect to a direction of rotation of the shift sleeve, said connecting means overlapping the distal end of the shift fork; and c. said side legs having outer slider surfaces for transmitting force between the gearbox shift fork and the shift sleeve, said outer slider surfaces covering at least partially the side surfaces of the gearbox shift fork.

2. The plastic slider pad of claim 1 wherein the two side legs are each configured as an elongated strip, and the connecting means connect an end of one strip with an end of the other strip.

3. The plastic slider pad of claim 1 wherein the connecting means comprise an elastic, thin-walled connecting link.

4. The plastic slider pad of claim 1 wherein the plastic slider pad is generally U-shaped and the two side legs are connected to each other by a generally strip-shaped base member that extends beyond the end of the shift fork.

5. The plastic slider pad of claim 1 wherein the connecting means is configured as a V-shaped base member having connecting legs which blend into the side legs.

6. The plastic slider pad of claim 1 wherein a side leg is configured as a generally elongated strip having at least one side edge which is arc shaped for conformance with an arc-shaped contour of the gearbox shift fork and/or the shift sleeve.

7. The plastic slider pad of claim 1 wherein each side leg is configured as an elongated strip provided with a longitudinal groove open to the outside of the side leg for partitioning the side leg into a slider region and a carrier region.

8. The plastic slider pad of claim 7 wherein the carrier region and the slider region of the side leg are provided with differing thicknesses.

9. The plastic slider pad of claim 1 wherein at least one detent device is molded into place on at least one of the side legs for engagement with a corresponding recess in the gearbox shift fork.

10. The plastic slider pad of claim 1 wherein a connecting pin projects from at least one of the surfaces facing each other of the two side legs for engagement with a corresponding bore in the gearbox shift fork.

11. The plastic slider pad of claim 10 wherein the connecting pin is provided with a coaxial bore.

12. The plastic slider pad of claim 10 wherein two connecting pins are spaced from one another and project from at least one side leg for engagement with corresponding bores in the gearbox shift fork.

13. The plastic slider pad of claim 12 wherein the connecting pins located nearer to the connecting means are shorter than the connecting pins located at a greater distance.

14. The plastic slider pad of claim 7 wherein at least one detent device is molded into place at least partially in the carrier region of the side leg.

15. The plastic slider pad of claim 1 wherein the plastic slider pad is configured as a one-piece molding with two generally parallel elongated strips spaced apart from one another to form the side legs, one end of each being connected to a corresponding end of the other by the connecting means, wherein the connecting means is strip-shaped and is approximately half as thick as each of the side legs.

* * * * *